United States Patent [19]

Bono

[11] 4,335,837

[45] Jun. 22, 1982

[54] DISPENSING CONTAINER FOR PROPORTIONAL MIXING OF FLUIDS

[76] Inventor: Robert P. Bono, 518 Parker Ave., Monrovia, Calif. 91016

[21] Appl. No.: 81,773

[22] Filed: Oct. 4, 1979

[51] Int. Cl.³ .......................... B67D 5/42; G01F 11/02
[52] U.S. Cl. ................................... 222/137; 222/145; 222/266; 222/276; 222/288; 222/162
[58] Field of Search ............... 222/309, 162, 137, 145, 222/266, 276, 288

[56] References Cited

U.S. PATENT DOCUMENTS

| | | | |
|---|---|---|---|
| 2,271,767 | 2/1942 | Hummel | 222/134 |
| 3,168,213 | 2/1965 | De Gon | 222/137 X |
| 3,547,316 | 12/1970 | Heiskell | 222/137 X |
| 3,760,986 | 9/1973 | Castner et al. | 222/137 |

*Primary Examiner*—David A. Scherbel
*Attorney, Agent, or Firm*—Sellers and Brace

[57] ABSTRACT

A hand held dispenser constructed to dispense a mixture of separately stored fluids and including provision for simultaneously dispensing this mixture in one of a plurality of preselected ratios. The dispensing mechanism is normally spring biased to a retracted position from which it is manually shiftable to the mixing and dispensing position from which it is manually shiftable to the mixing and dispensing position. The device includes provision for blocking fluid flow from separate storage chambers and for arresting flow while the ratio selector mechanism is undergoing adjustment to a different position.

7 Claims, 10 Drawing Figures

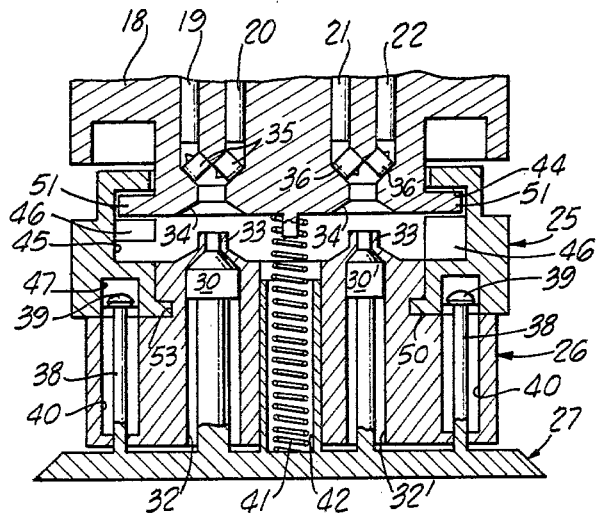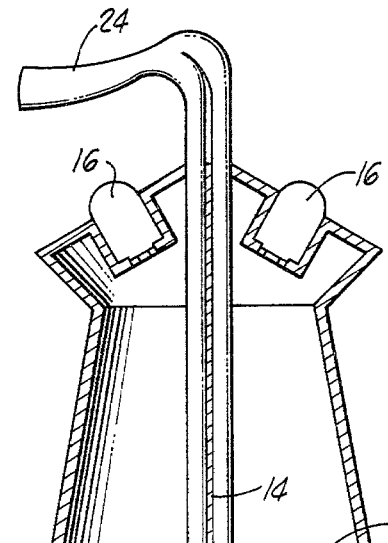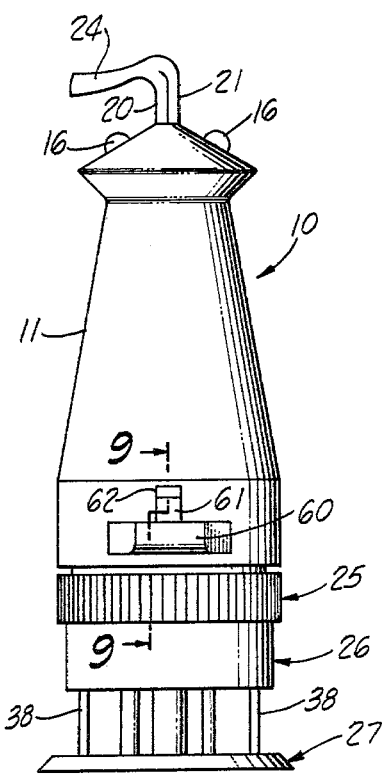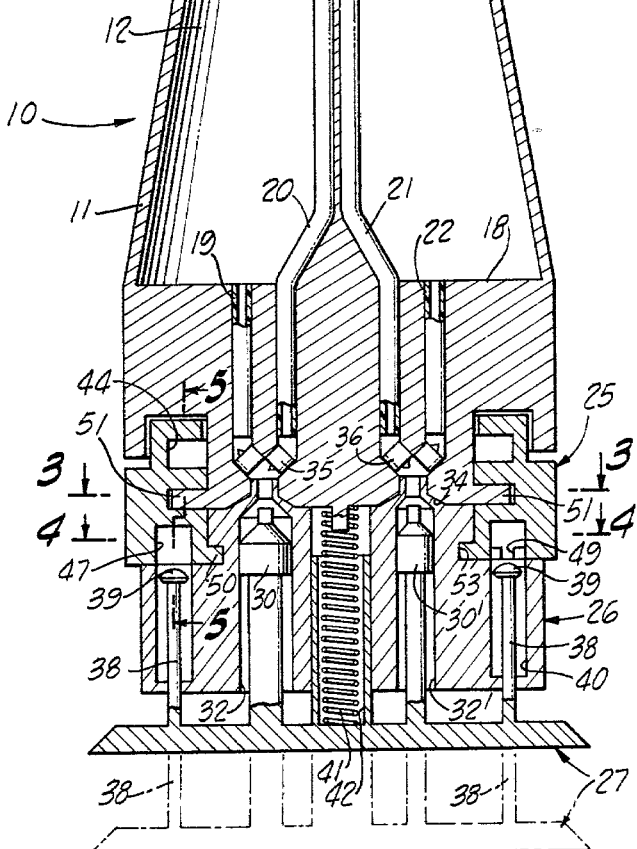

DISPENSING CONTAINER FOR PROPORTIONAL MIXING OF FLUIDS

This invention relates to dispensing devices, and more particularly to a unique hand held device for dispensing a mixture of fluids from a set of separate storage chambers in any one of a plurality of pre-selected ratios.

The present invention has been evolved to meet the need for a simple, reliable, inexpensive dispenser for intermixing and dispensing separately stored fluids from a common container. Desirably, the device includes simple means for varying the relative proportions of the fluids withdrawn and intimately intermixed. The present invention meets these objectives and includes fool proof provision against mishaps.

In an illustrative embodiment, the dispenser comprises a container sized to be readily held in the hand and divided into a pair of storage chambers provided with separate filling openings and vending caps. The mixing and dispensing nozzle includes a pair of passages connected to a respective storage chamber via a selected set of several pairs of dispensing pistons of different relative ratios. These pairs are mounted for indexing so that a selected pair is in communication with the two dispensing passages. A spring normally holds all pistons extended with their associated chambers charged with fluid. When the pistons are advanced in unison, a predetermined quantity of each liquid is advanced, intermixed and discharged through a common outlet.

Accordingly, it is a primary object of this invention to provide a dispenser having separate fluid storage chambers equipped with means for discharging preselected proportions of the two fluids in intermixed condition.

Another object of the invention is the provision of a fluid dispenser for intermixing and selectively discharging different predetermined proportions of a plurality of liquids from separate storage chambers of a common container.

Another object of the invention is the provision of a fluid dispenser having a plurality of fluid storage chambers in communication with a common mixing and dispensing outlet and including manually operable means for supplying fluid from these chambers to the outlet in one of several predetermined proportions.

These and other more specific objects will appear upon reading the following specification and claims and upon considering in connection therewith the attached drawing to which they relate.

Referring now to the drawing in which a preferred embodiment of the invention is illustrated:

FIG. 1 is an elevational view of an illustrative embodiment of the invention dispenser with the pistons fully retracted;

FIG. 2 is a vertical cross sectional view of FIG. 1 on an enlarged scale;

Figure 3:
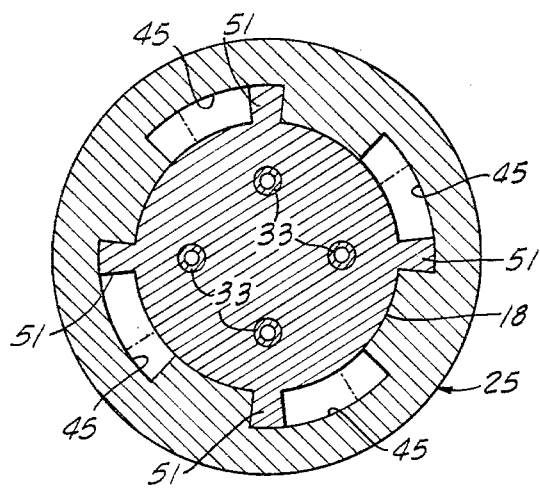
Figure 4:
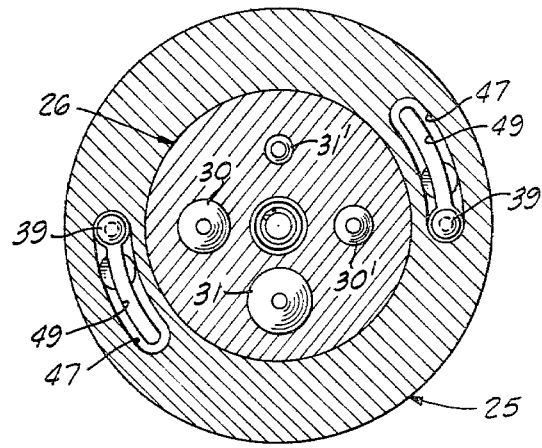
Figure 5:
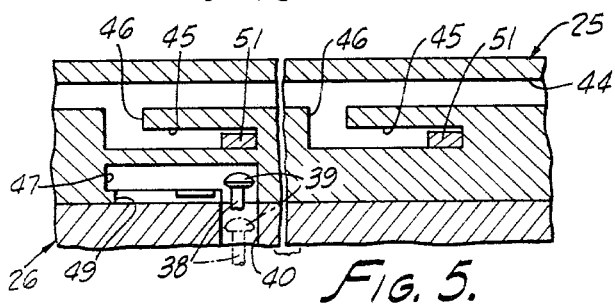
Figure 6:
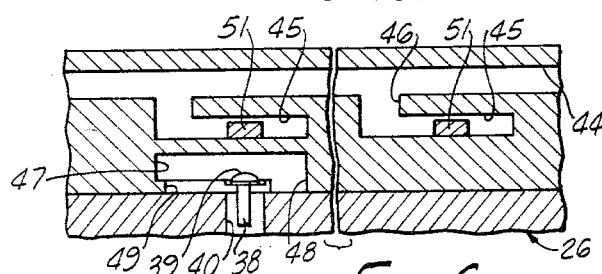
Figure 7:
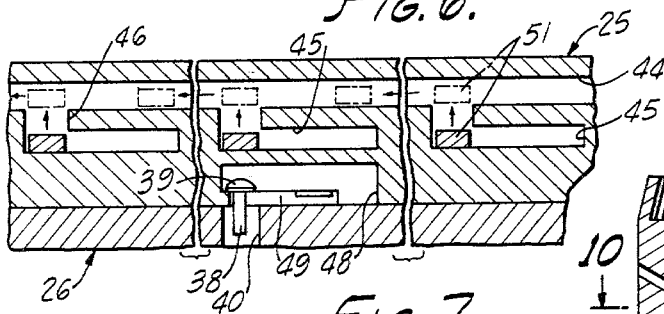
Figure 10:
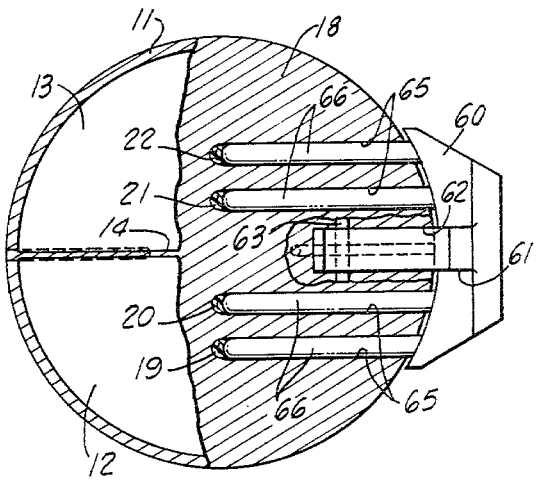
Figure 9:
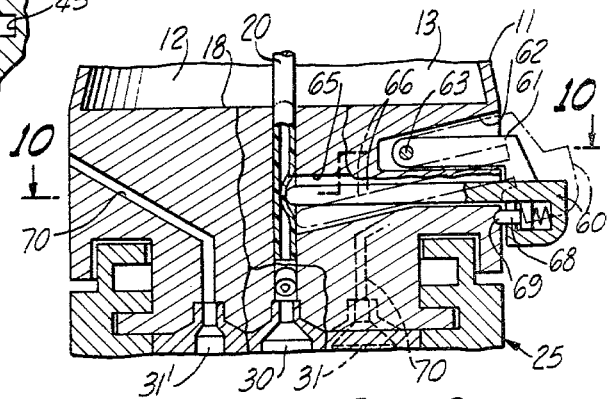

FIGS. 3 and 4 are cross sectional views taken respectively along lines 3—3 and 4—4 of FIG. 2;

FIG. 5 is a fragmentary cross sectional view taken along line 5—5 on FIG. 2;

FIG. 6 is a cross sectional view similar to FIG. 5 showing the locking ring rotated into an intermediate stage and holding the pistons extended;

FIG. 7 is a view similar to FIG. 6 but showing the piston locking ring rotated further to the right from the FIG. 6 position;

FIG. 8 is a fragmentary cross sectional view similar to FIG. 2 but showing the dispensing pistons locked fully extended thereby permitting the piston assembly to be rotated to align a different pair of pistons with the two fluid dispensing passages;

FIG. 9 is a fragmentary cross sectional view on an enlarged scale taken along the broken line 9—9 on FIG. 1 showing the fluid passages closed against fluid flow; and FIG. 10 is a cross sectional view taken along line 10—10 on FIG. 9.

Referring initially more particularly to FIGS. 1 and 2 there is shown an illustrative embodiment of the invention proportioning dispenser designated generally 10. The dispenser comprises container 11 divided into two storage chambers 12 and 13 by an upright partition 14. Container 11 is of a size conveniently held in the hand for manipulation as desired while dispensing a mixture of the fluids from chambers 12 and 13. Each chamber includes a fluid charging port closed by a vented cap 16 for admitting air as the contents of the storage chambers are consumed.

The thickwalled bottom 18 of container 11 supports four flexible walled tubes 19, 20, 21 and 22. Tubes 19 and 22 convey fluid from chambers 12 and 13 into an associated underlying piston chamber whereas tubes 20 and 21 extend upwardly along either side of partition 14 and open into the inlet or mixing chamber of the dispensing nozzle 24. This nozzle is sufficiently long to permit thorough intermixing of the fluids and its outlet end may include a jetting orifice, an atomizer or a spray nozzle of any suitable well known type.

The three lowermost components of the dispenser include a proportioner regulating ring 25, a piston housing 26 and a common and container support manipulating ring 27 interconnecting the several dispensing pistons. As herein shown by way of example, piston housing 25 is provided with two pairs of pistons 30, 30' and 31, 31', the pistons of each pair being located diametrically opposite one another as is best shown in FIG. 4. These pistons may be molded integral with or suitably secured to their underlying piston rods and with support ring 27. It will be noted that pistons 30 and 31 are larger than one another and larger than a respective one of pistons 30' and 31'. Each piston has a close sliding fit in a respective piston chamber 32, 32' in piston housing 26. The several pistons are urged to their fully retracted position by a compression spring 41 located along the vertical axis of the container with one end bearing against the container bottom and the other end seated in a wall of the operating and support ring 27.

It will be noted that the upper ends of each piston is provided with the converging surface terminating in a short cylindrical portion and that the upper outer end of each piston chamber is similarly constructed to seat in a complemental counterbore 34 (FIG. 8). These counterbores interconnect the lower ends of a respective pair of ducts 19, 20 and 21, 22. Interposed between counterbores 34 and the lower end of each pair of ducts 19, 20 and 21, 22, are pairs of oppositely functioning check valves 35 and 36. For example, check valve 35 at the lower end of duct 19 opens downwardly to permit filling of the underlying piston chamber as its piston 30 moves downwardly, and valve 35 at the lower end of duct 20 opens to permit liquid to flow upwardly through tube 20 as piston 30 moves upwardly in its chamber. Check valves 36 are of the same construction and function in the same manner.

The manual operating ring 27 is provided with a pair of posts 38 provided with heads 39 at their upper ends. Heads 39 reciprocate in wells 40 of piston housing 26 and engage the bottom of these wells to limit the retraction movement of the pistons under the influence of the compression spring 41. When the pistons are fully extended upwardly, heads 39 can engage recesses in ring 27 to lock the pistons extended as will be described presently.

Piston housing 26 is held assembled to container bottom 18 by the control ring 25 which has a continuous inwardly opening annular groove 44 and four inwardly opening short arcuate grooves 45 best shown in FIGS. 5 to 7. The left hand end of the short grooves 45 open into groove 44 via vertical passages 46. Underlying one diametrically opposed pair of grooves 45 is a pair of inverted L-shaped grooves 47 having a downwardly directed inlet passage 48 at their right hand end as viewed in FIGS. 5 to 7 and a slotted bottom wall 49. Grooves 47, 48 and their slotted bottoms 49 are positioned to receive heads 39 of posts 38 and thereby lock all pistons fully extended. The post itself is shiftable lengthwise of slot 49 and the head 39 of the post is engageable with the bottom of groove 47 for the purpose of locking ring 27 and all pistons fully extended upwardly against the upper ends of their respective chambers as shown in FIGS. 6, 7 and 8. FIG. 5 shows post 38 and its head 39 entering the right hand end of groove 47, whereas FIGS. 6 and 7 show the post head 39 resting against the slotted bottoms 49 of the grooves. When in the latter position the pistons are positively locked in the extended position shown in FIG. 8.

Ring 25 is held rotatably assembled to the piston housing 26 by one or more pins 50 extending inwardly from its inner periphery into an associated outwardly opening arcuate recess 53 having a length corresponding to the length of grooves 45 and 47 positioned as shown in FIG. 8. These pins 50 cooperate with the grooves 53 in holding the ring assembled to housing 26 and in limiting the rotary movement of the ring relative to housing 26.

Referring to FIGS. 3, 5 and 8, it is pointed out that the container bottom 18 is provided with four radial tangs 51 which operate in their grooves 44, 45 and 46, and cooperate therewith to permit limited axial relative movement between the piston housing and the container at certain times and at others to permit the piston housing to rotate freely through 360° about the bottom of the container. Normally tangs 51 are located at the right hand end of grooves 45 as viewed in FIG. 5, a selected one of a pair of the pistons then being operatively aligned with the lower end of ducts 19 to 22 as shown in FIG. 2. At such times, the piston operating ring 27 is reciprocable to dispense a mixture of the fluids from chambers 12 and 13. However, when tangs 51 are positioned in groove 44, as they are in FIG. 8, the pistons are locked fully extended and the container body is freely rotatable about the axis of ring 25, piston body 26 and ring 27, thereby to align another pair of pistons with counterbores 34.

Referring now more particularly to FIGS. 1, 9 and 10, there will be described lock out means for preventing the flow of fluids through the lower ends of ducts 19 to 22 at any time at the user's option and more particularly during the time when ring 25 is in use to substitute one pair of pistons for another. For this purpose the thick bottom 18 of the container is provided with an operating button 60. This button is provided with an inverted L-shaped bracket 61 extending radially into a recess 62 where it is pivotally supported by a pin 63. Container bottom 18 is also provided with four horizontally disposed slots 65 extending inwardly to the outer sidewalls of the flexible ducts 19 to 22. Each slot 65 loosely accommodates one of the four prongs 66 rigidly fixed to button 60. Prongs 66 have a length such that when button 60 is pivoted to the dot and dash position shown in FIG. 9, it permits the adjacent one of tubes 19 to 22 to expand fully. However, when button 60 is rotated downwardly through a short arc, prongs 66 lie in a generally horizontal plane with their inner ends holding the adjacent one of tubes 19 to 22 collapsed against the other sidewall thereby blocking flow of fluid in each of these tubes. The elasticity of the flexible tubes is effective to hold button 60 elevated in the dot and dash line position, when not latched depressed. However, when the button is pressed downwardly a spring biased pin 68 is held seated in a detent recess 69 to hold the button latched in which position prongs 66 hold each of the tubes collapsed to block fluid flow.

One final structural detail remains to be identified, namely a pair of venting passages 70—70 opening to the atmosphere through the sidewall of container bottom 18 and communicating with the upper ends of the pair of piston chambers not in operating position to dispense fluid. It will therefore be recognised that these venting passages permit air to enter and to exit from the non-dispensing piston chambers.

OPERATION

When the dispenser is ready for use the heads 39 of posts 38 are held seated against the bottom of wells 40 by spring 42 as shown in FIGS. 1 and 2. All pistons are fully retracted and the piston chambers are then charged with fluid from chambers 12 and 13 respectively in one particular ratio or relative proportions. These measured volumes are dispensed by moving the manual manipulating disc 27 upwardly in opposition to spring 41 thereby forcing the liquid upwardly past the check valves 35 and 36 through ducts 20 and 21 into the mixing chamber provided in nozzle 24 whereupon the thoroughly intermixed fluids are discharged through the common discharge port of nozzle 24. As soon as the pressure on the disc or ring 27 is released, spring 41 returns this ring and all pistons to the position shown in FIG. 2, thereby refilling the two piston chambers with fluid through the inlet ducts 19 and 22 and past the respective check valves 35 and 36 associated with these particular ducts. During this operation the check valves at the lower end of ducts 20 and 21 close preventing back flow of liquid filling these tubes. The dispensing operation may be repeated as many times as desired.

Assume now that the user wishes to change the proportions of the two fluids being dispensed. Preferably, the shift to a different ratio is carried out while the dispenser is held over a lavatory or the like to receive the small portion of the liquids filling the piston chambers. Alternatively and to avoid wasting some fluid, the unit can be shut off and locked in the FIG. 6 position after each dispensing operation so that the next user can make a ratio shift without any waste. Also the next user can elect to use the previous ratio. The operator then depresses button 60 until pin 68 latches the button depressed in detent 69 (FIG. 9). This operation collapses each of the ducts 19 to 22 to prevent all liquid flow. The pistons are then moved to their fully extended position shown in FIG. 8 and held firmly in this position while rotating ring 25 counter-clockwise as viewed in FIG. 8 to lock the heads 39 of posts 38 on the edges of slots 49 in the bottoms of grooves 47. Once the heads 39 engage the edges of slot 49 spring 41 cannot move the pistons 30, 30' away from their fully extended positions. Ring 25 can then be rotated counter-clockwise until heads 39 and tangs 51 are located in the left hand end of grooves 45 and 47 directly underlying passages 46 (FIGS. 5 and 7). Container 11 can now be elevated away from piston housing 26 and ring 27 as tangs 51 move vertically through passages 46 into the annular groove 44. Ring 25 and housing 26 may now be rotated as a unit relative to container 11 until the alternate set of pistons 31, 31' is in axial alignment with counterbores 34 at the lower ends of ducts 19 to 22. Thereupon ring 25 is rotated clockwise until tangs 51 are in alignment with passages 46 for return therethrough into grooves 45. Ring 25 is then rotated to restore tangs 51 to the right hand end of grooves 45 and posts 38 to a similar position whereupon spring 41 restores all pistons to their retracted positions as shown in FIG. 2. Button 60 is then released from its locked position shown in full lines in FIG. 9 and is readily elevated to the dot and dash line position by the elasticity of the ducts 19 to 22.

While the particular dispensing container for a mixture of fluids from separate storage chambers herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A hand-held liquid dispenser for dispensing a plurality of intermixed liquids separately stored therein comprising:
   a container sized to be grasped in the user's hand and provided with a plurality of separate storage chambers;
   a liquid mixing and dispensing nozzle fixed immovably to said container having a single outlet and a plurality of inlets in communication with said outlet;
   a supporting base for said container reciprocable axially thereof and normally spring biased to an extended position to support said container and its contents elevated above said base; and
   said supporting base including manually reciprocable piston means in communication with a respective one of said storage chambers operable upon the retraction thereof in opposition to said spring to transfer separate charges of liquid from a respective one of said storage chambers to said nozzle and to intermix and dispense the same through said single outlet, and operable upon the reverse movement thereof by said spring to withdraw replenishment charges of liquid from an associated one of said storage chambers in readiness for transfer of said charges to said nozzle upon the next retraction movement of said piston means.

2. A liquid dispenser as defined in claim 1 characterized in that said piston means includes a plurality of pairs of pistons of different relative charge dispensing capacities, and means for positioning a selected pair of said pistons in communication with said storage chambers and with said nozzle inlets.

3. A liquid dispenser as defined in claim 2 characterized in that the pistons in a selected pair thereof are sized to dispense different relative proportions of the liquid from said storage chambers.

4. A liquid dispenser as defined in claim 2 in that said piston means is rotatable about the longitudinal axis of said container to locate a selected pair of said pistons in communication with said storage chambers and with said nozzle inlets.

5. A liquid dispenser as defined in claim 1 characterized in the provision of manually operable means for locking said piston means in the extended position thereof at the end of a liquid dispensing movement thereof.

6. A liquid dispenser as defined in claim 1 characterized in that said piston means includes manually operable means for cutting off liquid flow from each of said storage chambers to said piston means at the user's option.

7. A liquid dispenser as defined in claim 1 characterized in that said manually reciprocable piston means includes means for dispensing liquid from said storage chambers selectively in any of a plurality of different ratios.

* * * * *